(12) United States Patent
Mehta et al.

(10) Patent No.: US 10,228,148 B2
(45) Date of Patent: Mar. 12, 2019

(54) METHODS AND APPARATUSES TO ISOLATE VIBRATION

(71) Applicant: TRANE INTERNATIONAL INC., Piscataway, NJ (US)

(72) Inventors: Pavak Mehta, La Crescent, MN (US);
Todd W. Smith, Onalaska, WI (US);
Rod Lakowske, La Crosse, WI (US);
Daniel R. Crum, La Crosse, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 614 days.

(21) Appl. No.: 14/414,327

(22) PCT Filed: Jul. 11, 2013

(86) PCT No.: PCT/US2013/050065
§ 371 (c)(1),
(2) Date: Jan. 12, 2015

(87) PCT Pub. No.: WO2014/011870
PCT Pub. Date: Jan. 16, 2014

(65) Prior Publication Data
US 2015/0192310 A1    Jul. 9, 2015

Related U.S. Application Data

(60) Provisional application No. 61/670,326, filed on Jul. 11, 2012.

(51) Int. Cl.
*F24F 1/12* (2011.01)
*F04B 39/00* (2006.01)
(Continued)

(52) U.S. Cl.
CPC ............ *F24F 1/12* (2013.01); *F04B 39/0027* (2013.01); *F04B 39/0044* (2013.01);
(Continued)

(58) Field of Classification Search
CPC . F24F 1/12; F16L 27/10; F16L 27/102; F16L 27/11; F16L 55/0337; F04B 39/044; F04B 39/0038; F16F 15/04; F25B 2500/13
See application file for complete search history.

(56) References Cited

U.S. PATENT DOCUMENTS 282,967 A * 8/1883 Duffy ...................... F16L 27/11
285/226
350,422 A * 10/1886 Duffy ...................... F16L 27/11
285/226
(Continued)

FOREIGN PATENT DOCUMENTS

CN        201193902 Y      2/2009
CN        201589393 U      9/2010
(Continued)

OTHER PUBLICATIONS

Translation of Description of EP-2006591-A1.*
(Continued)

*Primary Examiner* — Orlando E Aviles
(74) *Attorney, Agent, or Firm* — Hamre, Schumann, Mueller & Larson, P.C.

(57) ABSTRACT

A vibration isolation apparatus for an air conditioning system may include a flow passage, at least a portion of which has a convoluted structure. The flow passage may also be coupled to two stabilizing members. The vibration isolation apparatus may include a structural supporting member to retain the two stabilizing members. The rod may be isolated from the stabilizing members by vibration isolation members. The vibration isolation apparatus may be positioned in a refrigeration line between an outlet of a compressor and a refrigerant pipe. The stabilizing members, the convoluted flow passage and the vibration isolation members may attenuate the vibration generated by the compressor so as to (Continued)

reduce the vibration transmitted to the refrigerant pipe. The structural supporting member may enhance the structural strength of the vibration isolation apparatus to withstand the pressure of the compressed refrigerant.

10 Claims, 10 Drawing Sheets

(51) Int. Cl.
*F16F 15/02* (2006.01)
*F16L 55/033* (2006.01)
(52) U.S. Cl.
CPC .......... *F16F 15/02* (2013.01); *F16L 55/0337* (2013.01); *F25B 2500/13* (2013.01)

(56) References Cited

U.S. PATENT DOCUMENTS

| | | | |
|---|---|---|---|
| 4,508,486 A | 4/1985 | Tinker | |
| 5,183,974 A | 2/1993 | Wilhem et al. | |
| 5,252,035 A * | 10/1993 | Lee | F04B 39/0044 181/403 |
| 5,272,285 A | 12/1993 | Miller | |
| 5,274,200 A | 12/1993 | Das et al. | |
| 5,588,810 A | 12/1996 | Diflora et al. | |
| 5,694,926 A | 12/1997 | DeVries et al. | |
| 5,791,696 A * | 8/1998 | Miyajima | F16L 11/11 285/222.1 |
| 5,804,775 A | 9/1998 | Pinnington | |
| 5,997,258 A | 12/1999 | Sawyer et al. | |
| 6,062,033 A | 5/2000 | Choi | |
| 6,116,374 A | 9/2000 | Westerbeke, Jr. | |
| 6,145,616 A | 11/2000 | Ewanek | |
| 6,322,339 B1 | 11/2001 | Mitsunaga et al. | |
| 7,278,834 B2 | 10/2007 | Herrick et al. | |
| 7,318,608 B2 | 1/2008 | Swartz et al. | |
| 7,357,219 B2 | 4/2008 | Mafi et al. | |
| 7,526,903 B2 | 5/2009 | Kandasamy | |
| 7,845,463 B2 | 12/2010 | Yabe et al. | |
| 8,061,475 B2 | 11/2011 | Mori et al. | |
| 8,100,127 B2 * | 1/2012 | Worley | A61M 16/0875 128/202.27 |
| 2004/0069307 A1 * | 4/2004 | Rich | F16L 27/108 128/207.14 |
| 2005/0006895 A1 | 1/2005 | Muroi et al. | |
| 2005/0167189 A1 | 8/2005 | Aisenbrey | |
| 2005/0274569 A1 | 12/2005 | Seel | |
| 2006/0144637 A1 | 7/2006 | Swartz et al. | |
| 2006/0283657 A1 | 12/2006 | Dubensky et al. | |
| 2007/0169504 A1 | 7/2007 | Vinocur | |
| 2008/0099274 A1 | 5/2008 | Seel | |
| 2008/0099275 A1 | 5/2008 | Seel | |
| 2009/0065299 A1 | 3/2009 | Vito et al. | |
| 2009/0309355 A1 * | 12/2009 | Turfait | F01N 13/1816 285/145.5 |
| 2010/0070085 A1 | 3/2010 | Harrod et al. | |
| 2010/0116583 A1 | 5/2010 | Seedorf | |
| 2011/0017544 A1 | 1/2011 | Bodwell et al. | |
| 2011/0067949 A1 | 3/2011 | Mori et al. | |
| 2012/0193505 A1 | 8/2012 | Baron | |
| 2012/0279245 A1 * | 11/2012 | Subramaniam | F25D 23/00 62/296 |
| 2014/0050572 A1 | 2/2014 | Mehta et al. | |

FOREIGN PATENT DOCUMENTS

| | | | | |
|---|---|---|---|---|
| EP | 2006591 A1 * | 12/2008 | | F16L 27/11 |
| JP | 55-45084 | 3/1980 | | |
| JP | 2007-035043 | 2/1995 | | |
| JP | 2000-199482 | 7/2000 | | |
| JP | 2000-240982 | 9/2000 | | |
| JP | 2009-293905 | 12/2009 | | |
| KR | 20-1990-0001060 | 2/1990 | | |
| KR | 10-2003-0050932 | 6/2003 | | |
| KR | 20-0390456 | 7/2005 | | |
| KR | 10-866173 | 10/2008 | | |

OTHER PUBLICATIONS

International search report for International application No. PCT/US2013/050065, dated Oct. 1, 2013 (3 pages).
Written opinion for International application No. PCT/US2013/050065, dated Oct. 1, 2013 (7 pages).
International search report for International application No. PCT/US2013/055601, dated Dec. 17, 2013, (3 pgs).
Written opinion for International application No. PCT/US2013/055601, dated Dec. 17, 2013, (8 pgs).
U.S. Non-final Office Action for U.S. Appl. No. 13/970,325, dated Oct. 7, 2015, 16 pgs.
U.S. Non-final Office Action for U.S. Appl. No. 14/422,138, dated Aug. 21, 2015, 12 pgs.
U.S. Non-final Office Action for U.S. Appl. No. 14/422,138, dated Dec. 16, 2015, 16 pgs.
U.S. Non-final Office Action for U.S. Appl. No. 14/422,138, dated May 6, 2016 (19 pages).
U.S. Final Office Action for U.S. Appl. No. 14/422,138, dated Sep. 8, 2016 (20 pages).

* cited by examiner

Fig. 5

METHODS AND APPARATUSES TO ISOLATE VIBRATION

FIELD OF TECHNOLOGY

Embodiments disclosed herein relate generally to vibration isolation in a system with a pressurized flow passage. Specifically, the embodiments disclosed herein relate to isolating vibration of a compressor from other components of an air conditioning system with a compressor. In one application, the embodiments disclosed herein can be, for example, used in a chiller system with a screw compressor.

BACKGROUND

An air conditioning system, such as a vapor-compression system, typically has a compressor, a condenser, an evaporator, and/or exhaust fans. During a typical cooling cycle, the compressor can compress refrigerant vapor to high-pressure high-temperature refrigerant vapor. The high-pressure high-temperature refrigerant vapor can release heat in the condenser and become a liquid refrigerant. The liquid refrigerant can then flow to the evaporator through an expansion valve, and transform to the vapor state as the liquid refrigerant absorbs heat. The vaporized refrigerant from the evaporator can then circulate back to the compressor to be compressed in the compressor.

There are several types of compressors for the vapor-compression type of air conditioning system, such as reciprocating compressors, scroll compressors, screw compressors and centrifugal compressors. These types of compressors are typically powered by electric motors or gas turbines. When in operation, the compressors can generate vibration and noise. For example, in a chiller system, the screw compressor is one of the main sources of vibration and noise.

In the vapor-compression type of air conditioning system, the pressure of the refrigerant vapor after the refrigerant vapor is compressed by the compressor can be relatively high, for example up to about 350 psi. Refrigerant lines, such as pipes carrying the high pressure refrigerant vapor are generally configured to be able to withstand at least two times the pressure of the compressed refrigerant vapor. The pipes therefore generally are rigid. The rigid pipes can not only create noise, but also transmit vibration of one component, such as the compressor, to other parts of the air conditioning system, such as the refrigerant line(s) and/or the components such as an oil separator of the air conditioning system, causing operation noise of the air conditioning system. In transmitting the vibration, rigid pipes themselves can radiate sound as well.

SUMMARY

A compressor of an air conditioning system, for example, a screw compressor of a chiller, can vibrate and generate noise in operation. In the air conditioning system, the vibration of the compressor may migrate to other parts of the air conditioning system through a flow passage including a suction line and/or a discharge line, causing noise. Methods and apparatuses isolating vibration from the compressor to the flow passage, such as the suction line and/or the discharge line of the air conditioning system, are described. The vibration isolation apparatus may generally include a conduit that is configured to carry a fluid, such as refrigerant in its various liquid/gaseous states, and have a convoluted structure to absorb vibration. The conduit may be configured to be connected to a stabilizing member(s). The stabilizing member(s) may be configured to impede at least a portion of the vibration. The conduit may have a structural supporting member(s) that is configured to retain and/or enhance a structure of the conduit, so that the conduit may withstand a pressure of the fluid, e.g. refrigerant. The structural supporting member(s) may be isolated from the stabilizing member(s) via vibration isolation member(s).

The vibration isolation apparatus may be positioned between an outlet of a compressor and a refrigerant pipe, such as a suction line and/or discharge line. The stabilizing member(s), the convoluted conduit and the vibration isolation member(s) may attenuate the vibration generated by the compressor so as to reduce the vibration transmitted to the refrigerant pipe. The structural supporting member(s) may enhance the structural strength of the vibration isolation apparatus to withstand the pressure of the compressed refrigerant.

In some embodiments, the conduit may include a convoluted section and a non-convoluted section. In some embodiments, the structural supporting member(s) may be generally rigid and generally can withstand the pressure of the refrigerant flow.

In some embodiments, one of the stabilizing members may have a vibration isolation member cavity, and at least a portion of the vibration isolation member may be received in the vibration isolation member cavity.

A method of isolating vibration through a flow passage structure may include directing vibration through a conduit with a convoluted structure and stabilizing the conduit with a stabilizing member. The method may further include providing a structural supporting member to retain the conduit and the stabilizing member, and isolating the structural supporting member from the stabilizing member by an isolation member.

BRIEF DESCRIPTION OF THE DRAWINGS

FIGS. 3A to 3F illustrate different views of an embodiment of a vibration isolation apparatus.

FIG. 3E is an end view of the vibration isolation apparatus.

FIG. 3F is a sectional view along the line F-F of FIG. 3E.

FIGS. 4A to 4D illustrate sectional views of different embodiments of a vibration isolation member.

DETAILED DESCRIPTION

During the operation of an air conditioning system, a compressor can compress a refrigerant and generate vibration at the same time. Certain types of compressors, such as a screw type compressor of a chiller system, can generate a relatively high level of vibration and relatively high pressure of the refrigerant. The refrigerant pipes are generally required to withstand the high pressure of the compressed refrigerant. The vibration can be transmitted from the compressor to other parts of the air conditioning system including the rigid refrigerant lines/pipes, an oil separator, a condenser, etc. The vibration can cause noise of the air conditioning system when in operation. The noise can be difficult to reduce because the vibration causing the noise is transmitted to different parts of the air conditioning system. Isolating the vibration of the compressor from other parts of the air conditioning system may help reduce the vibration and noise of the air conditioning system.

In the following description of the illustrated embodiments, methods and apparatuses to isolate the vibration of the compressor from other parts of the air conditioning system are described. A high pressure side of the compressor may be isolated from a discharge line by a vibration isolation apparatus. In some embodiments, the vibration isolation apparatus may be configured to have a conduit that is configured to carry a fluid, such as a refrigerant, and also impede vibration. In some embodiments, the conduit may have a convoluted structure to reduce the vibration. In some embodiments, the vibration isolation apparatus may have a structural supporting member configured to retain and/or enhance the structure and/or stability of the convoluted structure so that the convoluted structure can withstand the pressure of the compressed refrigerant. The structural supporting member may also be configured to be isolated from the conduit by a vibration isolation member. In some embodiments, the conduit and the structural supporting member may be generally parallel to each other. In some embodiments, the conduit and the structural supporting member may be positioned between two stabilizing members. The stabilizing members may be configured to be relatively heavy to impede vibration.

References are made to the accompanying drawings that form a part hereof, and in which is shown by way of illustration of the embodiments may be practiced. It is to be understood that the terms used herein are for the purpose of describing the figures and embodiments and should not be regarded as limiting the scope of the present application.

Figure 1:
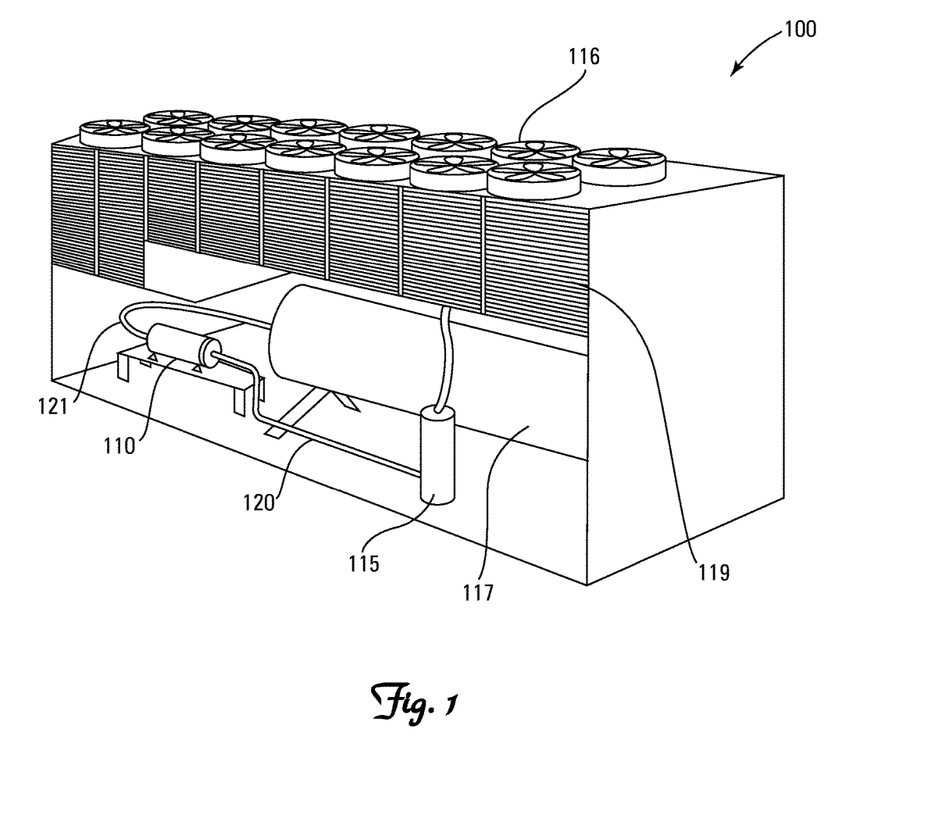
FIG. 1 illustrates a perspective view of an air conditioning system.

FIG. 1 illustrates one example of an air conditioning system 100. The air conditioning system 100 may include a compressor 110, an oil separator 115, an evaporator 117, a condenser coil(s) 119 and fans 116. In one application, the air conditioning system 100 may be a chiller system. In operation, the compressor 110 can compress a refrigerant vapor, which can flow into the condenser coil 119 through a discharge line 120. In the condenser coil 119, the high pressure compressed refrigerant vapor can release heat and become refrigerant liquid. The refrigerant liquid can then flow into the evaporator 117, in which the refrigerant liquid can absorb heat, for example, from water, and become refrigerant vapor. The refrigerant vapor can then circulate back to the compressor 110 through a suction line 121.

The discharge line 120 and the suction line 121 are configured to connect different components of the refrigeration system, and are configured to carry the refrigerant through the air conditioning system 100. In an air conditioning system 100, for example, with a screw type compressor 110, the discharge line 120 and the suction line 121 are configured to be rigid to withstand a pressure of the refrigerant before and after being compressed by the compressor 110. The vibration of the compressor 110 can be transmitted to the components of the air conditioning system 100 including the discharge line 120 and the suction line 121, the oil separator 115, the condenser coil 119, causing noise.

Figure 2:
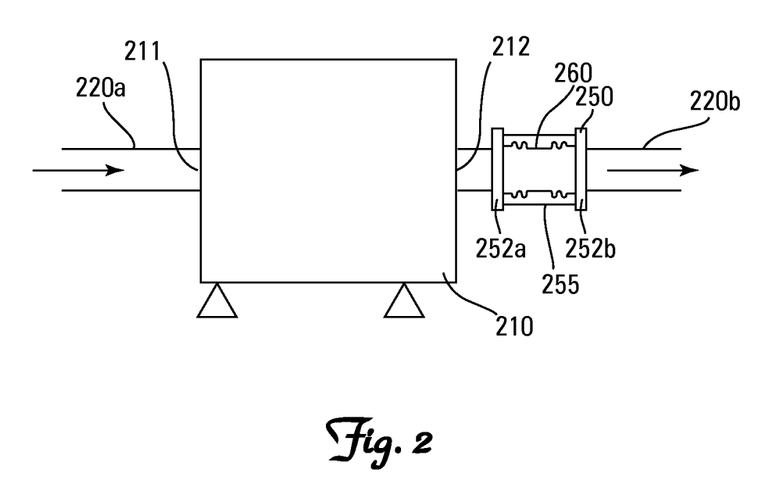
FIG. 2 illustrates a compressor equipped with an embodiment of a vibration isolation apparatus.

Referring to FIG. 2, a compressor 210 equipped with a vibration isolation apparatus 250 is illustrated. The arrows indicate the flow direction of a refrigerant. Refrigerant vapor flows into the compressor 210 from a low pressure inlet 211 via a suction line 220a, and then is compressed by the compressor 210. The compressed refrigerant vapor comes out of a high pressure outlet 212 of the compressor 210, and flows to the discharge line 220b through the vibration isolation apparatus 250. In the embodiment shown, the vibration isolation apparatus 250 is positioned between the high pressure outlet 212 of the compressor 210 and the discharge line 220b. The vibration isolation apparatus 250 generally has a first stabilizing member 252a and a second stabilizing member 252b. In the illustrated embodiment, the first stabilizing member 252a is connected to the compressor outlet 212, and the second stabilizing member 252b is connected to the discharge line 220b. The vibration isolation apparatus 250 also has a vibration isolation conduit 260 that is positioned between the first stabilizing member 252a and the second stabilizing member 252b, and is in fluid communication with the compressor outlet 212 and the discharge line 220b. In some embodiments, the first and second stabilizing members 252a and 252b can be two metal flanges that are connected to the two ends of the vibration isolation conduit 260. The compressed refrigerant can flow from the compressor outlet 212 to the discharge line 220b through the vibration isolation conduit 260. The vibration isolation apparatus 250 can help prevent the vibration of the compressor 210 from transmitting to the discharge line 220b.

The first stabilizing member 252a and the second stabilizing member 252b can be held together by at least one structural supporting member 255. The structural supporting member 255 has a first end and a second end that can be configured to connect to the first stabilizing member 252a and the second stabilizing member 252b. The structural supporting member 255 is generally parallel to the vibration isolation conduit 260. In some embodiments, the structural supporting member 255 is rigid. In some embodiments, the structural supporting member 255 is a metal tie rod.

As shown in FIG. 2, vibration of the compressor 210 can be transmitted to the discharge line 220b, for example, by two pathways: one is through the first stabilizing member 252a to the vibration isolation conduit 260 and then to the second stabilizing member 252b; and another one is through the first stabilizing member 252a to the structural supporting member 255 and then to the second stabilizing member 252b. As illustrated below, vibration isolation mechanisms are incorporated in both pathways to isolate the vibration of the compressor 210 from the pipe 220b. Therefore, at least a portion of the vibration of the compressor 210 is not transmitted to the discharge line 220b, resulting in vibration reduction in the discharge line 220b.

In some embodiments, the vibration isolation apparatus may be configured to only have one stabilizing member. The stabilizing member may be configured to be attached to the compressor via one or more structural supporting members so that the vibration isolation conduit is flanked by the compressor and the stabilizing member.

It is to be appreciated that the vibration isolation apparatus 250 can also be used between the low pressure suction pipe 220a and the compressor inlet 211, or generally anywhere along a refrigerant line(s) of an air conditioning system. It is also to be appreciated that the applications of the vibration isolation apparatus as described herein are not limited to a compressor of an air conditioning system. The vibration isolation apparatus can generally be used in any flow passage that requires vibration isolation. The vibration isolation apparatus may be particularly suitable for a flow passage that bears a relatively high flow pressure and/or stress load.

Figure 3A:
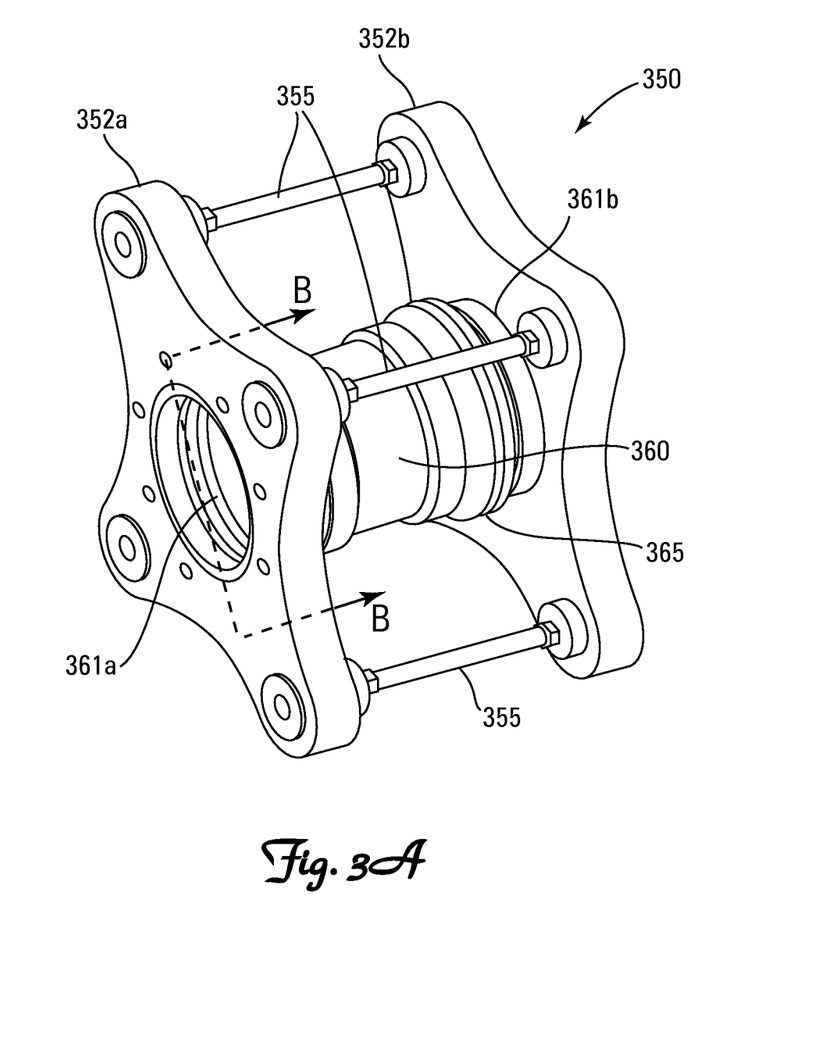
FIG. 3A is a perspective view of the vibration isolation apparatus.

Referring to FIGS. 3A to 3F, another embodiment of a vibration isolation apparatus 350 is illustrated. As shown in FIG. 3A, the vibration isolation apparatus 350 can have a first stabilizing member 352a and a second stabilizing member 352b. In some embodiments, the first and second stabilizing members 352a and 352b may be two metal flanges. The first stabilizing member 352a may be configured to be connected to a high pressure outlet, e.g. the high pressure outlet 212 of the compressor 210 as shown in FIG. 2. The second stabilizing member 352b may be configured to be connected to a refrigerant line, e.g. the discharge line 220b as shown in FIG. 2. The two stabilizing members 352a and 352b are connected by at least one structural supporting member 355. In some embodiments, the structural supporting member 355 may be a metal tie rod. In some embodiments, the structural supporting member 355 can withstand a stress load of at least about 1500 psi to 6000 psi to a cross-section of a conduit, such as the vibration isolation conduit 260 as illustrated in FIG. 2.

A vibration isolation conduit 360 is situated between the two stabilizing members 352a and 352b. The stabilizing members 352a and 352b are configured to have center openings 361a and 361b respectively. The center openings 361a and 361b receive respective ends of the conduit 360 and are generally coaxial and in fluid communication with the vibration isolation conduit 360. At least a portion of the vibration isolation conduit 360 is configured to be convoluted and has at least one convoluted structure 365.

As discussed above, the vibration of the compressor can be transmitted between the first stabilizing member 352a to the second stabilizing member 352b by two pathways: the first one is between the first stabilizing member 352a, the vibration isolation conduit 360 and the second stabilizing member 352b; and the second one is between the first stabilizing member 352a, the structural supporting member 355 and the second stabilizing member 352b.

Figure 3B:
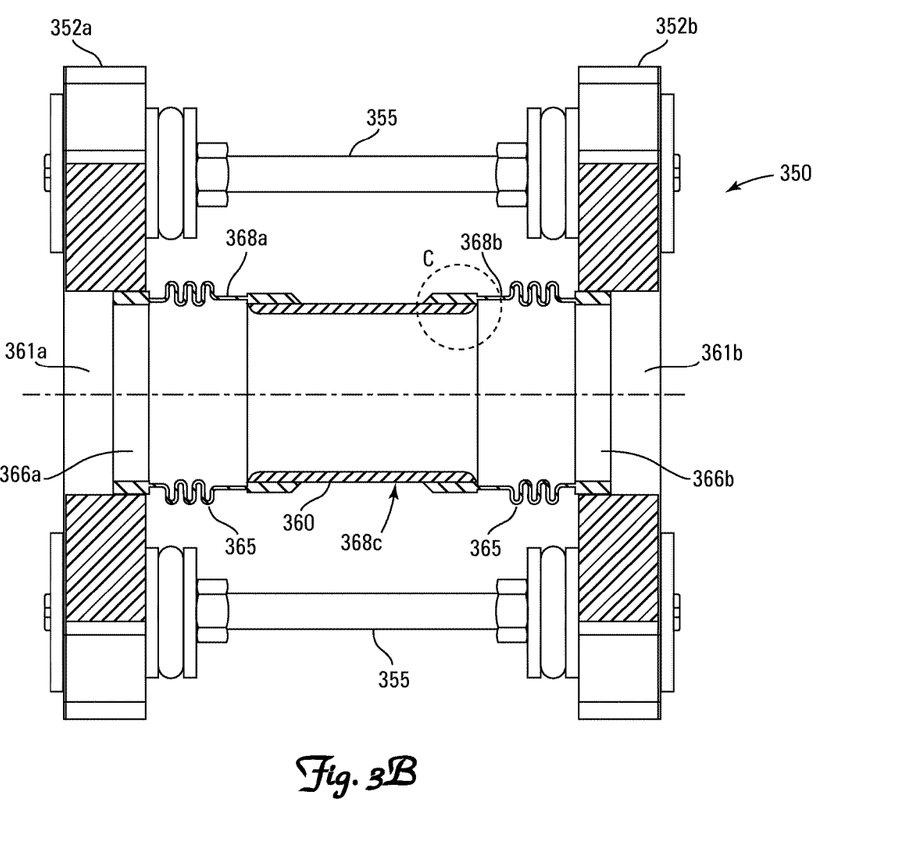
FIG. 3B is a sectional view along the line B-B of FIG. 3A.

Referring now to FIG. 3B, a cross section view from line B-B as shown in FIG. 3A is illustrated. The two stabilizing members 352a and 352b are connected to each other by the structural supporting members 355. The center openings 361a and 361b of the first stabilizing member 352a and the second stabilizing member 352b respectively are coupled to and coaxial with a first opening 366a and a second opening 366b of the vibration isolation conduit 360, and are in fluid communication with the vibration isolation conduit 360. In the illustrated embodiment, the first opening 366a is configured to be closer to the compressor, while the second opening 366b is configured to be closer to the discharge line when installed in an air conditioning system. When the vibration isolation apparatus 350 is installed in an air conditioning system, the first stabilizing member 352a for example is configured to be connected to a compressor and the second stabilizing member 352b is configured to be connected to a discharge line. The refrigerant can flow from the compressor to the discharge line through the vibration isolation conduit 360.

The vibration isolation conduit 360 can have multiple sections: end sections 368a and 368b, and a middle section 368c. In the embodiment shown, a portion of the end sections 368a and/or 368b is convoluted and has at least one convoluted structure 365. In the embodiment shown, the middle section 368c is configured to be a straight (non-convoluted) tube connecting the end sections 368a and 368b. In some embodiments, the middle section 368c may be configured to be convoluted, while the end sections 368a and/or 368b may be not convoluted.

It is to be noted that the vibration isolation conduit 360 does not have to be a multi-section construction. In some embodiments, the vibration isolation conduit 360 can have a one-piece construction, at least a portion of which is configured to be convoluted. The multiple-section construction may help simplify a manufacturing process of the vibration isolation conduit 360, because making each section separately may be easier than making the whole vibration isolation conduit 360 as one piece. In some embodiments, the straight middle section 368c can help the vibration isolation conduit 360 to withstand a high stress/pressure load to a cross section of the vibration isolation conduit 360, such as about 1500 psi. In some embodiments, the end sections 368a and 368b can be configured to have the same convoluted structure. In some other embodiments, the end sections 368a and 368b can be configured to have different convoluted structures. In addition, the length of the middle section 368c can vary. Furthermore, the end sections 368a and 368b and the middle section 368c can be made of different materials and/or different number of layers of materials, such as metal layers. Therefore, the multi-section construction can also help increase the configuration variations of the vibration isolation conduit 360 to fit for different purposes.

Figure 3C:
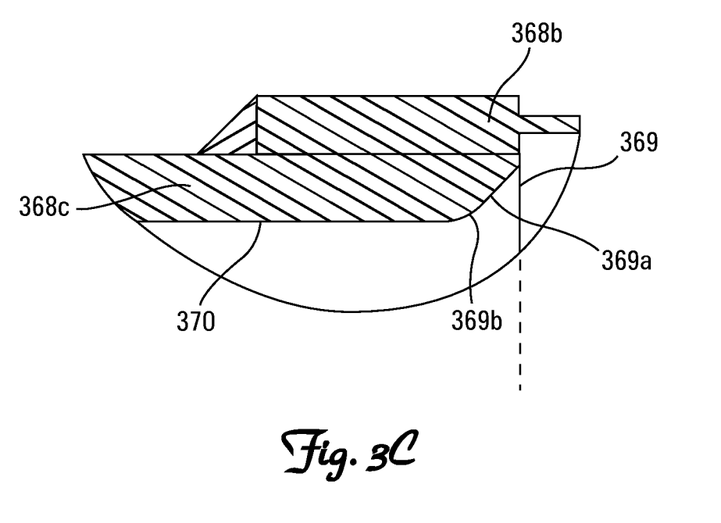
FIG. 3C is an enlarged view of area C in FIG. 3B.

An enlarged view of an area C of FIG. 3B is illustrated in FIG. 3C. A portion of the junction between the end section 368b and the middle section 368c is shown. An end 369 of the middle section 368c can be configured to have a sloped structure 369a that forms an inward ramp from an opening of the end 369. A rounded portion 369b is configured to connect the sloped structure 369a to an internal surface 370 of the middle section 368c. The sloped structure 369a and the rounded portion 369b may help create a smooth surface for a refrigeration flow so as to reduce pressure drop in the refrigerant flow when the refrigerant flows through the middle section 368b during operation.

Figure 3D:
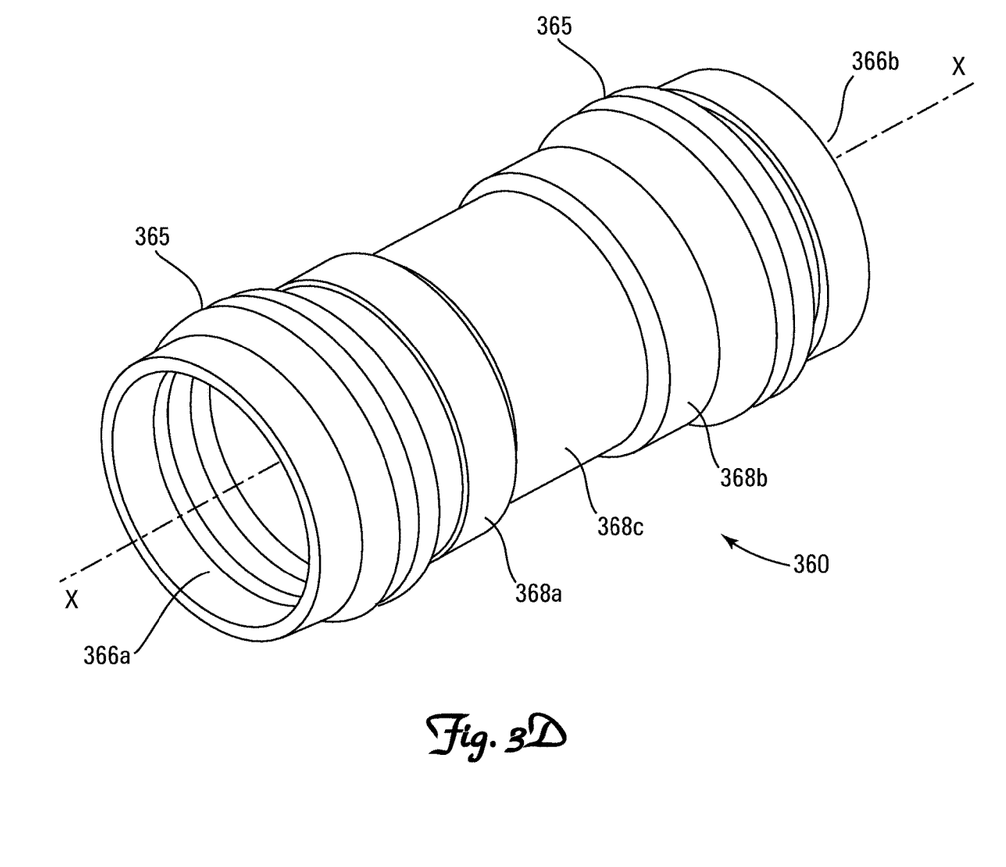
FIG. 3D is a perspective view of the conduit of the vibration isolation apparatus of FIG. 3A.

Referring now to FIG. 3D, a perspective view of the vibration isolation conduit 360 is illustrated. As discussed above, the vibration isolation conduit 360 generally has the first opening 366a and the second opening 366b. The first opening 366a and second opening 366b generally have a circular profile. Diameters of the first opening 366a and second opening 366b can be the same or be different. The end sections 368a and 368b are configured to have at least one convoluted structure 365 each. In the illustrated embodiment, the end sections 368a and 368b have three convoluted structures each. The convoluted structures 365 can have more room to expand along a center axis X than the non-convoluted portion of the end sections 368a and 368b. In addition, the convoluted structures can travel laterally to the center axis X. Therefore, the convoluted structures are more flexible than a non-convoluted structure. When vibration is transmitted to the vibration isolation conduit 360, the vibration can cause deformation, such as compression, extension and lateral movements, of the convoluted structures. The flexibility of the convoluted structures 365 may help prevent vibration being transmitted through the vibration isolation conduit 360 by storing and dissipating the vibration energy in the convoluted structures 365.

It is to be noted that the convoluted structures 365 is just one exemplary embodiment. The general principle is that at least a portion of the end sections 368a and 368b can be deformed (including compression, expansion and/or lateral movements) when being vibrated. For example, the end sections 368a and 368b can be made of an elastic material without any convoluted structures, and vibration can cause deformation of the elastic material. In some other embodiments, the vibration isolation conduit 360 can be configured to have a convoluted middle section that is flanked by two non-convoluted end sections. (Not shown.)

The material and structure of the non-convoluted middle section 368c can be different from the end sections 368a and 368b. For example, the end sections 368a and 368b can be made of multiple layers of metal, such as copper or steel. This multiple-layered structure may help increase the flexibility of the end sections 368a and 368b, as well as maintaining a structural strength and providing damping to the convoluted structure 365. The middle section 368c can be configured to be rigid. For example, the middle section 368c can be configured to be a rigid steel tube.

Figure 3E:
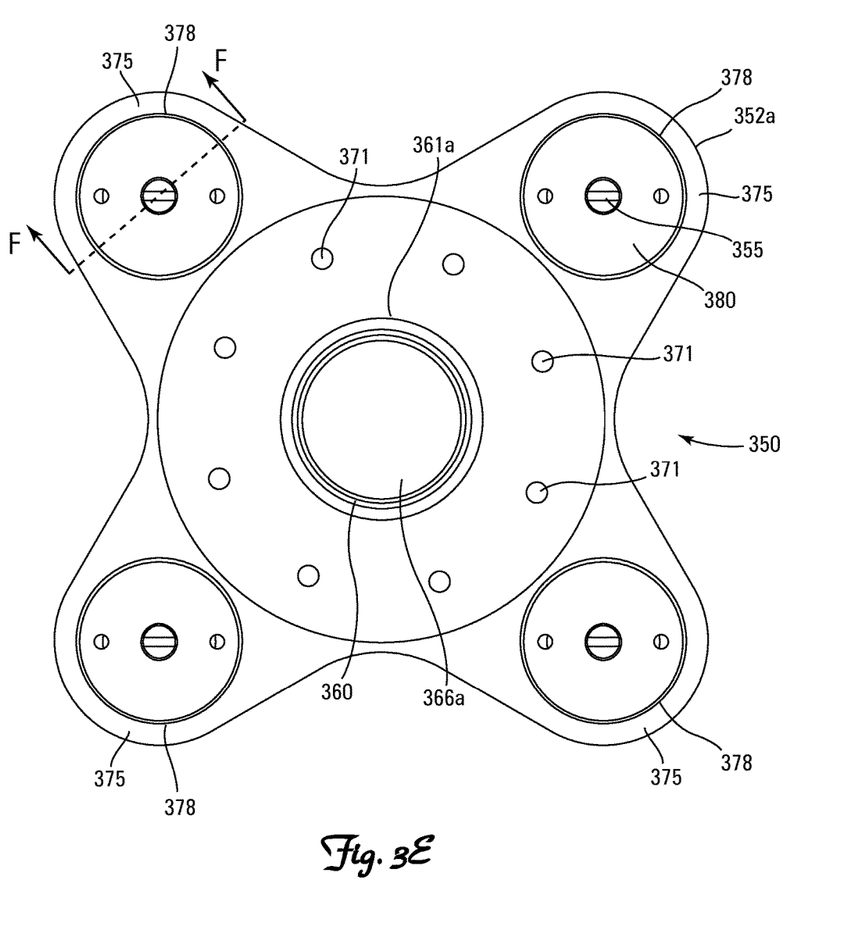

Referring now to FIG. 3E, an end view of the vibration isolation apparatus 350 is shown. It is to be noted that the other end view of the vibration isolation 350 may have a similar configuration as the end view shown in FIG. 3E. The first stabilizing member 352a has a center opening 361a that is generally coaxial with the first opening 366a of the vibration isolation conduit 360. The first stabilizing member 352a can be mounted to the compressor high pressure outlet 212 (as shown in FIG. 2) by a suitable mounting method, for example by screws 371. The first stabilizing member 352a (as well as the second stabilizing member 352b that is not shown) has a plurality of corners 375. In the illustrated embodiment, the first stabilizing member 352a has four corners 375. Each of the corners 375 has an isolation member cavity 378 that is configured to accept a vibration isolation member (as shown in FIG. 3F described below). The structural supporting member 355 is also generally positioned in a center of the vibration isolation member cavity 378. An end cap 380 is connected to the structural supporting member 355.

A cross section at line F-F on FIG. 3E is illustrated in FIG. 3F. Both of the first stabilizing member 352a and the second stabilizing member 352b have a vibration isolation member cavity 378. A vibration isolation member 382 is generally received by the vibration isolation member cavity 378. The vibration isolation member 382 has a center bore 384 that is configured to accept the structural supporting member 355. The structural supporting member 355 may be a metal tie rod or any other suitable rigid structures. As illustrated, the structural supporting member 355 passes through the center bore 384 of the vibration isolation member 382 and is attached to the end cap 380. The end cap 380 can have a center hole with a thread, which can be bolted onto a matching thread on the structural supporting member 355. The end caps 380 press against the first ends 386a of the vibration isolation members 382 of the stabilizing members 352a and 352b.

A holding device, such as a washer 389 and a nut 388 can be configured to press against second ends 386b of the vibration isolation member 382. The structural supporting member 355 can have two ends, 355a and 355b; and each of the two ends can be configured to have threads, and the nut 388 can be configured to bolt to the threads and push the washer 389 against the second end 386b of the vibration isolation member 382. The end caps 380 and the holding devices can be tightened toward each other and press the vibration isolation members 382 against the stabilizing members 352a and 352b. In such a way, the end caps 380 and the holding devices (e.g. the washer 389 and the nut 388) can brace the vibration isolation member 382. In some embodiment, a spacer 390 can be positioned between the vibration isolation members 382 and the stabilizing members 352a and/or 352b. In some embodiments, the spacer 390 can help fill in a space between the isolation members 382 and the stabilizing members 352a and 352b. In some embodiments, by using the spacer 390, a thickness of the stabilizing members 352a and 352b can be changed without changing the isolation members 382.

It is noted that the end caps 380 may at least partially be received in the vibration isolation member cavity 378 of the stabilizing members 352a and 352b as illustrated in FIG. 3F. However, the end caps 380 do not generally contact the first stabilizing member 352a and/or the second stabilizing member 352b directly. As shown in FIG. 3F, the end caps 380 have a space 391 between a side wall of the end caps 380 and an inner side wall of the vibration isolation member cavities 378. The space 391 can prevent vibration from being transmitted from the stabilizing member 352b to the end cap 380 directly. Further, as shown in FIG. 3F, the end caps 380 have a space 392 between a bottom of the end caps 380 and a shoulder of the vibration isolation member cavities 378. The spaces 391, 392 can allow a certain degree of play for the end caps 380 during operation. For example, an increase of a stress load in the conduit 360 as shown in FIG. 3A can cause the space 392 to decrease. On the other hand, if the stress load (or pressure load) in the conduit 360 increases to a level so that the shoulders of the vibration isolation member cavities 378 of the stabilizing members 352a and 352b contact the end caps 380, the stress load (or pressure load) can be fully supported by the structural supporting member 355.

The vibration isolation member 382 can be made of an elastic material, such as rubber, neoprene, etc. By holding the stabilizing members 352a and 352b with the structural supporting member 355 and isolating the structural supporting member 355 from the stabilizing members 352a and 352b by the vibration isolating members 382, the vibration of the stabilizing members 352a, 352b and the structural supporting member 355 are isolated from each other by the vibration isolation members 382. At least some of the vibration of either the stabilizing member 352a or 352b can be impeded by the vibration isolation member 382 before the vibration is transmitted to the other stabilizing member.

Referring back to FIG. 3A, the vibration isolation conduit 360 may expand if the flow flowing through the conduit 360 is pressurized. However, as shown in FIG. 3F, the stabilizing members 352a and 352b are braced by the end caps 380 that are connected by the structural supporting member 355. The structural supporting member 355 has a length l. The arrangement of the structural supporting member 355 and the stabilizing members 352a and 352b can restrict the expansion of the conduit 360 along the direction of the length l. Consequently, the structure of the vibration isolation conduit 360 including the convoluted structure 365 can be retained, and the expansion of the vibration isolation conduit 360 as show in FIG. 3A under pressure can be limited within the length l.

As mentioned earlier, the pressure of the refrigerant at the outlet 212 of the compressor 210 as shown in FIG. 2 can be relatively high, for example about 350 psi. The convoluted structure 365 as shown in FIG. 3B may fail to withstand the high pressure of the compressed refrigerant by itself, and may expand (such as expand axially) under the pressure. The structural supporting members 355 may be configured to withstand the pressure of the refrigerant and hold the stabilizing members 352a and 352b in position and retain and/or enhance the structure of the convoluted structure 365 under the pressure of the refrigerant to limit the expansion of the convoluted structure 365.

The embodiment shown in FIGS. 3A to 3F generally have two vibration isolation members 382 for each of the structural supporting members 355. It is to be noted that in some embodiments, only one vibration isolation member is needed for each of the structural supporting members. In these embodiments, one end of each of the structural supporting members is isolated from one of the stabilizing members by the vibration isolation member. The other end of each of the structural supporting members can be attached to the other stabilizing member directly without using the vibration isolation member.

Figures 4A, 4B, 4C, 4D:
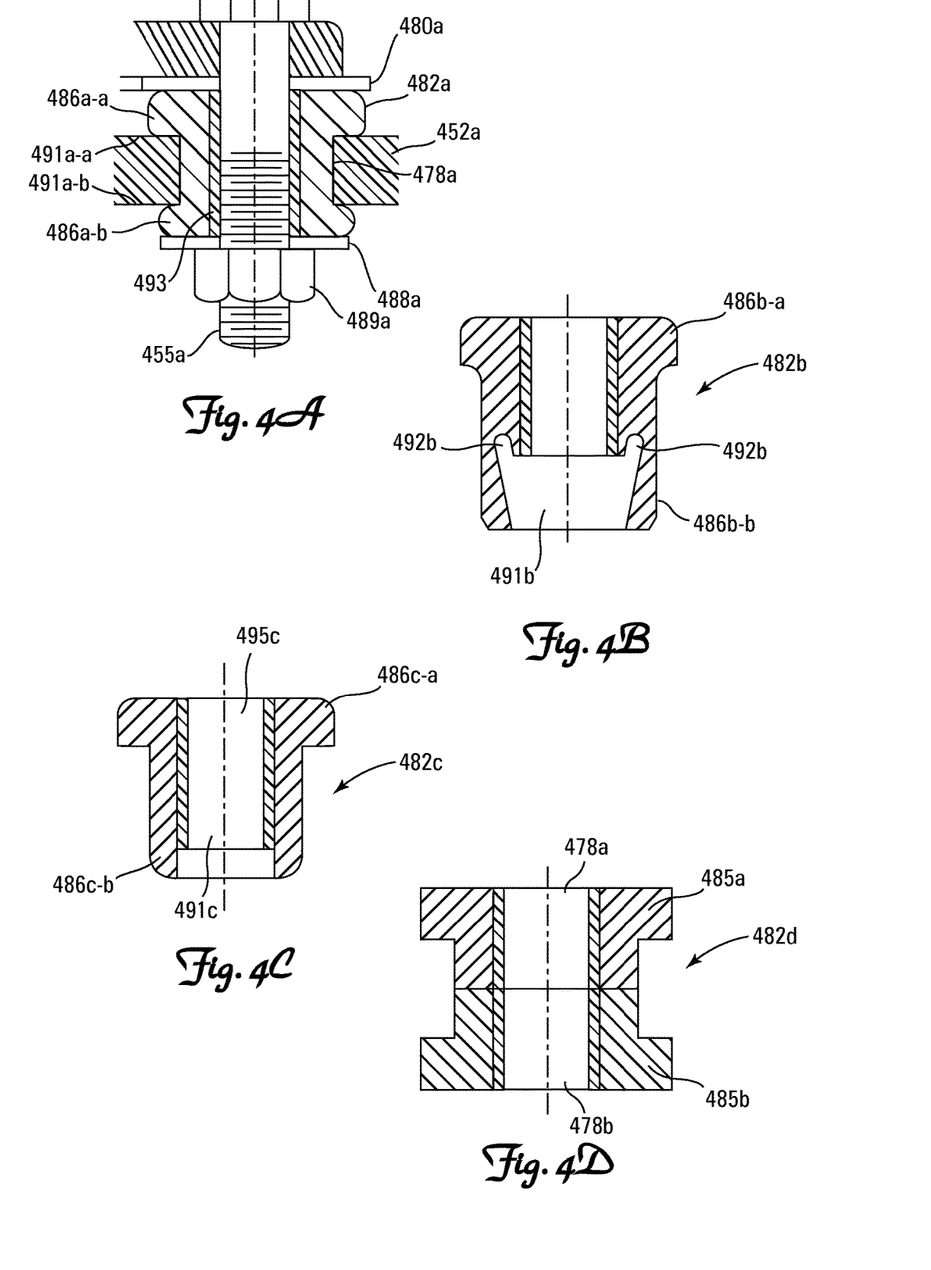
FIG. 4A is a sectional view of a vibration isolation member installed on a vibration isolation apparatus.
FIGS. 4B to 4D illustrate three different embodiments of a vibration isolation member before installed on a vibration isolation apparatus.

FIGS. 4A to 4C illustrate other exemplary embodiments of the vibration isolation member. As shown in FIG. 4A, a stabilizing member 452a can have a hole 478a that is configured to accept a vibration isolation member 482a. An outer end 486a-a of the vibration isolation member 482a may be pushed against an outer surface 491a-a of the stabilizing member 452a by a bottom of an end structure 480a. An inner end 486a-b of the vibration isolation member 482a may be pushed against an inner surface 491a-b of the stabilizing member 452a by a holding device, e.g. a washer 488a and a nut 489a. The nut 489a can be bolted on a thread of a structural supporting member 455a. Tightening the holding device 488a against the vibration isolation member 482a can push the outer end 486a-a and the inner end 486a-b against the outer surface 491a-a and the inner surface 491a-b respectively. The stabilizing member 452a is therefore supported by the vibration isolation member 482a. The vibration isolation member 482a can also isolate the structural supporting member 455a from the stabilizing member 452a.

The vibration isolation member 482a also has an internal sleeve 493 running through a center hole of the vibration isolating member 482a. The internal sleeve 493 can be made of a solid material, for example, metal. The end structure 480a and the washer 488a can be tightened to contact the internal sleeve 493. A length of the internal sleeve 493 can vary to control a compression of the vibration isolation member 482a when the end structure 480a and the washer 488a are tightened against the internal sleeve 493.

The vibration isolation member 482a can be made from neoprene, natural rubber, silicone, blended rubber, etc. In some embodiments, the vibration isolation member may be configured so that an axial stiffness is about the same as a radial stiffness. In some embodiments, the vibration isolation member may be configured to withstand a temperature of at least about 230 F.

The vibration isolation member may have different configurations. As illustrated in FIG. 4B, the outer end 486b-a of a vibration isolating member 482b may be generally "T" shaped. An internal space 491b of the inner end 486b-b may have an ear portion 492b. In operation, when the inner end 486b-b is pressed against the inner surface 491a-b of the stabilizing member 452a as shown in FIG. 4A, the ear portion 492b may form an internal air chamber inside the inner end 486b-b, which may help impede vibrations.

In another embodiment of a vibration isolation member 482c as shown in FIG. 4C, the internal space 491c of an inner end 486c-b may have a substantially similar diameter as an internal space 495c of the outer end 486c-a.

In yet another configuration as shown in FIG. 4D, a vibration isolating member 482d can be configured to have two separate portions, 485a and 485b. The two portions 485a and 485b have a center hole 478a and 478b respectively, which can be aligned. The two portions 485a and 485b can have different configurations, which may help increase a design flexibility of the vibration isolating member 482d.

In some embodiments, an internal sleeve, such as the sleeve 493 as illustrated FIG. 4A, may be equipped to center holes (e.g. center holes 478a and 478b) of the isolating members.

Figure 5:
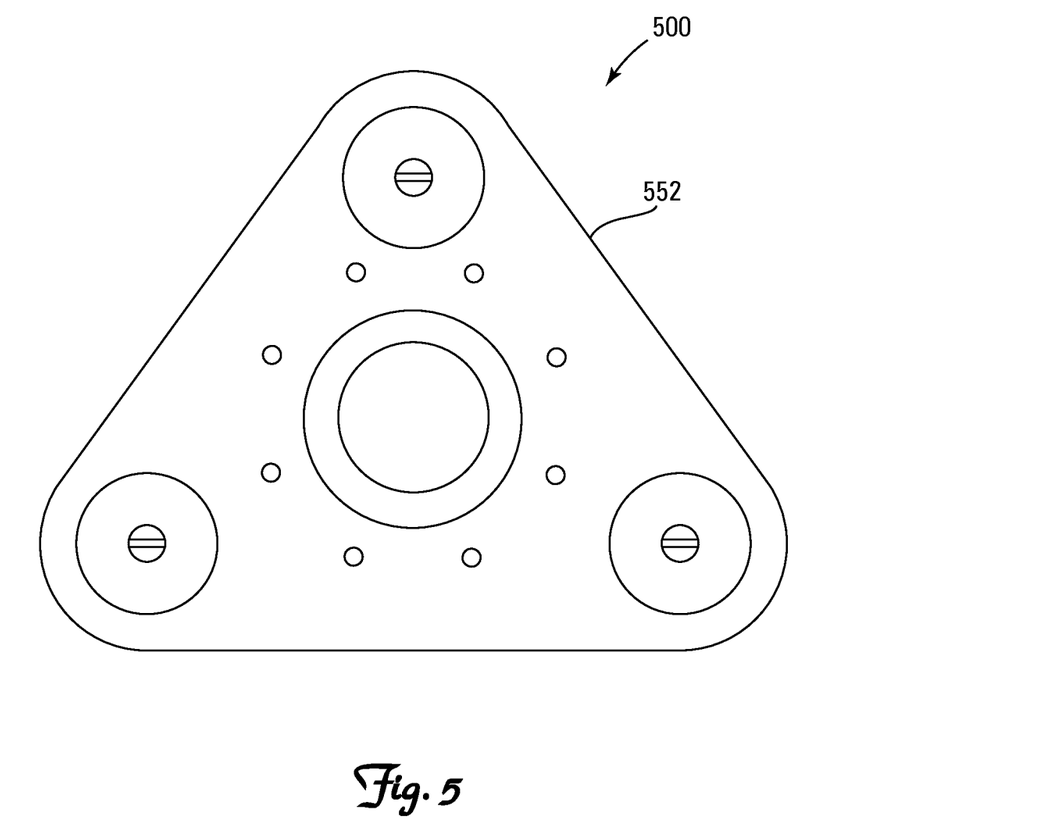
FIG. 5 illustrates a front view of another embodiment of a vibration isolation apparatus.
Figure 8F:
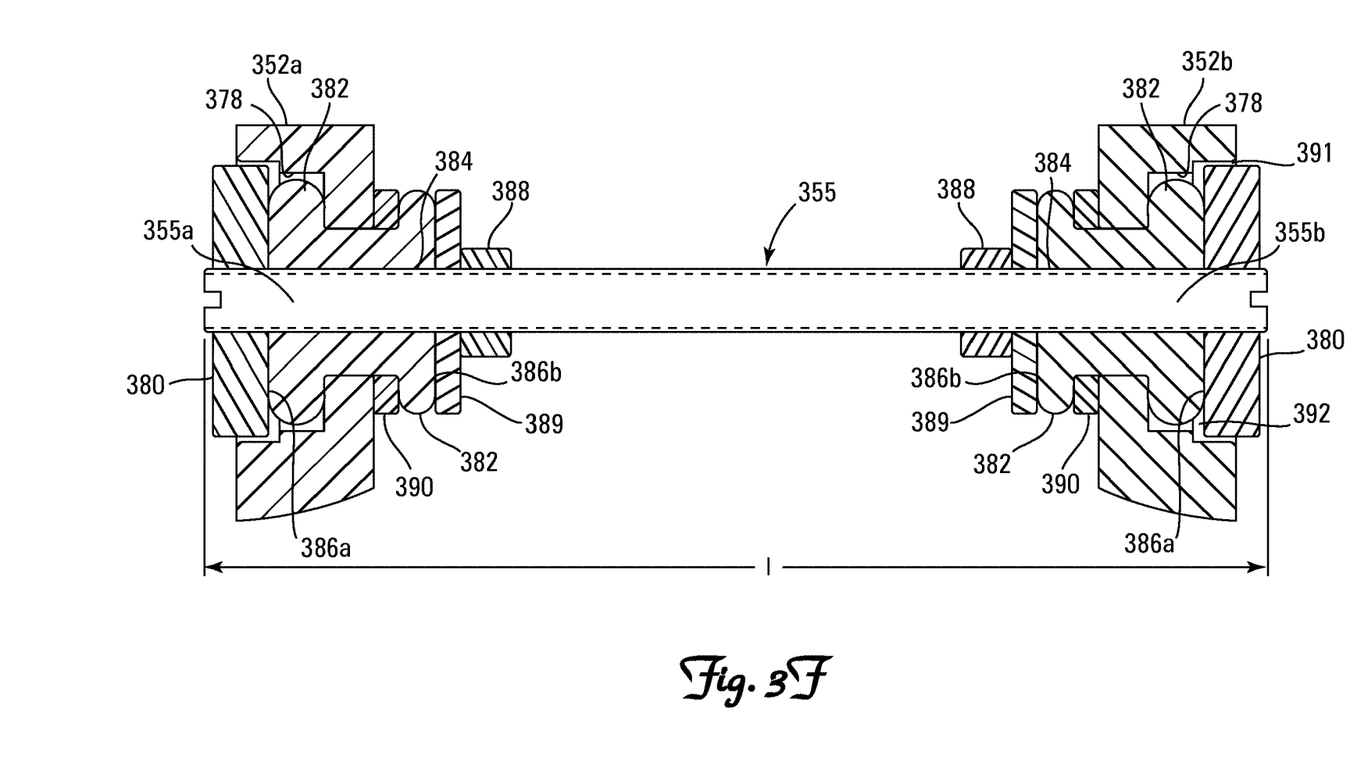

As illustrated in FIG. 5, a stabilizing member 552 of another embodiment of vibration isolation apparatus 500 does not have to have four corners. The stabilizing member 552 can have less than four corners, such as three corners as illustrated in FIG. 5. Configurations of other features, such as a conduit, structural supporting members, and/or isolating members may be similarly constructed as in the embodiment as illustrated in FIG. 3A. Each corner may be configured to support one structural supporting member. In other configurations, the stabilizing member 552 may have more than four corners, such as a hexagonal shape. In some embodiments, the stabilizing member may have other geometries.

Referring back to FIGS. 2 and 3A, during installation of an air conditioning system the first stabilizing member 252a (or 352a, or 452a) can be attached to the compressor outlet 212, and the second stabilizing member 252b (or 352b, or 452b) can be attached to the discharge line 220b.

When the compressor 210 is in operation, low pressure refrigerant may flow to the compressor 210 from the refrigerant inlet 211. The low pressure refrigerant may be compressed by the compressor 210, and may flow out of the refrigerant outlet 212. During this process, vibration can be generated by the compressor 210, and the pressure of the refrigerant pressure can be increased by the compressor 210.

Referring now to FIGS. 3B and 3F, it will be appreciated the first stabilizing member 352a may be configured to be attached to a compressor, and the second stabilizing member 352b may be configured to be attached to a refrigerant line, such as a suction line or a discharge line. As discussed above, the vibration of the compressor may be transmitted to the refrigerant lines, such as pipes via either the stabilizing member 352a—the structural supporting member 355—the stabilizing member 352b pathway or the stabilizing member 352a—the vibration isolation conduit 360—the stabilizing member 352b pathway. Because the vibration isolation conduit 360 may be configured to have the relatively flexible convoluted structure 365, the vibration of the compressor can at least be partially impeded by the flexible convoluted structure 365. In addition, the stabilizing members 352a and 352b may have a relative high weight compared to the conduit 360. In some embodiments, the stabilizing members 352a and 352b may be about 40-50 lbs. The weight of the first stabilizing member 352a and second stabilizing member 352b can help impede at least a portion of the vibration generated by the compressor. Consequently, at least a portion of the vibration of the compressor is not transmitted to the discharge line through the pathway including the stabilizing member 352a, the vibration isolation conduit 360, and the second stabilizing member 352b. It is to be noted that in some embodiments the weight of the first stabilizing member 352a can be different from the second stabilizing member 352b, so that the two stabilizing members can impede different frequencies of vibration. In some embodiments, the weight of the stabilizing members 352a and 352b can be the same.

To prevent vibration from transmitting from the compressor to the refrigerant line to other components through the stabilizing member 352a—the structural supporting member 355—the stabilizing member 352b pathway, as illustrated in FIG. 3F, the structural supporting member 355 is mounted to the first stabilizing member 352a and the second stabilizing member 352b through the vibration isolation members 382. Therefore the structural supporting member 355 is isolated from the first stabilizing member 352a and the second stabilizing member 352b by the vibration isolation members 382. A portion of the vibration of the first stabilizing member 352a can be impeded by the vibration isolation member 382 before the vibration being transmitted to the second stabilizing member 352b. Consequently, the second stabilizing member 352b can be at least partially isolated from the vibration of the first stabilizing member 352a.

Referring to FIG. 3B, as discussed above, the vibration of the compressor may be attenuated by the vibration isolation conduit 360 and first stabilizing member 352a and the second stabilizing member 352b. As shown in FIG. 3F, the vibration of compressor may also be attenuated by the vibration isolation members 382. Therefore, the vibration of the compressor can be at least partially be reduced by the vibration isolation apparatus 350 before being transmitted to the pipe. Furthermore, the structure of the conduit 360 of the vibration isolation apparatus 350 may be retained and/or enhanced by the structural supporting members 355 so as to withstand the pressure of the compressed refrigerant out of the compressor.

In some embodiments, a chiller system that is equipped with a vibration isolation apparatus similar to the vibration isolation apparatus 350 as shown in FIG. 3 between a compressor and a discharge line can reduce an operation noise level by about 10-15 dB, for example, compared to a chiller system without such a vibration isolation apparatus.

It is to be noted that the embodiments described herein are exemplary. The vibration isolation apparatus may generally include a combination of a vibration impeding structure and a structure to retain and/or enhance the structural strength of the vibration impeding structure. Generally, the vibration impeding structure may be a flexible material or structure. A vibration impeding structure may also include a weight to further impede the vibration energy transmission. However, generally the vibration impeding structure, because of its flexibility, may not be able to withstand the high pressure of the compressed refrigerant and can expand under the pressure. A structural supporting member may be coupled to the vibration impeding structure to limit the expansion of the vibration impeding structure so as to help the vibration impeding structure withstand the pressure. The structural supporting member may be generally rigid and generally can withstand the pressure of the compressed refrigerant. The structural supporting member may be coupled to the vibration impeding structure through a vibration isolation member.

Any aspects 1-3 can be combined with any aspects 4-20. Aspect 4 can be combined with any aspects 5-20. Any aspects 5-10 can be combined with any aspects 11-20. Any aspects 11-13 can be combined with any aspects 14-20. Any aspects 14-16 can be combined with any aspects 17-20. Aspect 17 can be combined with any aspects 18-20.

Aspect 1. A vibration isolation apparatus comprising:
   a conduit having a first opening and a second opening forming a flow passage therebetween, at least a portion of the conduit being convoluted;
   a first stabilizing member attached to the conduit proximate the first opening; a second stabilizing member attached to the conduit proximate the second opening;
   at least one structural supporting member having a first end and a second end; and
   a first vibration isolation member attached to the first end and a second vibration isolation member attached to the second end of the at least one structural supporting member,
      wherein the first end of the at least one structural supporting member is isolated from the first stabilizing member by the first vibration isolation member, and the second end of the at least one structural supporting member is isolated from the second stabilizing member by the second vibration isolation member.

Aspect 2. The vibration isolation apparatus of aspect 1, wherein the first stabilizing member has a first vibration isolation member cavity and the first vibration isolation member is at least partially received by the first vibration isolation member cavity, and the second stabilizing member has a second vibration isolation member cavity and the second vibration isolation member is at least partially received by the second vibration isolation member cavity.

Aspect 3. The vibration isolation apparatus of aspects 1-2, wherein the first end of the at least one structural supporting member is connected to a first end cap, and the second end of the at least one structural supporting member is connected to a second end cap, the first and second end caps brace the first and second stabilizing members.

Aspect 4. A vibration isolation apparatus comprising:
   a convoluted flow passage and a stabilizing member that are configured to impede vibration along a vibration path defined by the convoluted flow passage and the stabilizing member;
   a structural supporting member; and
   a vibration isolating member;
      wherein the convoluted flow passage and the stabilizing member are retained by the structural supporting member, and the vibration isolation member is configured to isolate the structural supporting member from the stabilizing member and the convoluted flow passage.

Aspect 5. An air conditioning system comprising:
   a compressor having a refrigerant outlet;
   a pipe configured to carry refrigerant;
   a vibration isolation apparatus having a first stabilizing member and a second stabilizing member, the first stabilizing member connected to the refrigerant outlet and the second stabilizing member connected to the pipe;
   a flow passage in fluid communication with the refrigerant outlet and the pipe, at least a portion of the flow passage is convoluted, the flow passage situated between the first stabilizing member and the second stabilizing member;
   a first vibration isolation member; and
   a structural supporting member situated between the first stabilizing member and the second stabilizing member,
      wherein the structural supporting member has a first end and a second end, the first end is attached to the first stabilizing member by the first vibration isolation member.

Aspect 6. The air conditioning system of aspect 5 further comprising,
   a second vibration isolation member,
      wherein the second end of the structural supporting member is attached to the second stabilizing member by the second vibration isolation member.

Aspect 7. The air conditioning system of aspects 5-6, wherein the first stabilizing member has a first vibration isolation cavity to accept the first vibration isolation member, and a second vibration isolation cavity to accept the second vibration isolation member.

Aspect 8. The air conditioning system of aspects 5-7, wherein the first end of the structural supporting member is attached to an end cap and a holding member, the end cap and the holding member press the first vibration isolating member against the first stabilizing member.

Aspect 9. The air conditioning system of aspects 5-8, wherein the flow passage includes a non-convoluted section.

Aspect 10. The air conditioning system of aspects 5-9 further comprising a second vibration isolation apparatus, wherein the compressor has an inlet, and the second vibration isolation apparatus is attached to the inlet of the compressor.

Aspect 11. A method of isolating vibration through a flow passage structure comprising:
 directing vibration through a convoluted conduit;
 retaining the convoluted conduit with a structural supporting member; and
 isolating the structural supporting member from the convoluted conduit and the stabilizing member by a vibration isolation member.

Aspect 12. The method of isolation vibration of aspect 11 further comprising:
 stabilizing the convoluted conduit with a stabilizing member;

Aspect 13. The method of isolating vibration of aspects 11-12 further comprising: connecting the convoluted conduit to an outlet of a compressor of a refrigeration system.

Aspect 14. A vibration isolation apparatus comprising:
 a conduit having a first opening and a second opening forming a flow passage therebetween, at least a portion of the conduit being convoluted;
 a first stabilizing member attached to the conduit proximate the first opening;
 at least one structural supporting member having a first end and a second end; and
 a first vibration isolation member attached to the first end of the at least one structural supporting member,
 wherein the first end of the at least one structural supporting member is isolated from the first stabilizing member by the first vibration isolation member.

Aspect 15. The vibration isolation apparatus of aspect 14 further comprising:
 a second stabilizing member, wherein the second stabilizing member is attached to the second end of the at least one structural supporting member.

Aspect 16. The vibration isolation apparatus of aspect 15 further comprising a second vibration isolation member, wherein the second end of the at least one structural supporting member is isolated from the second stabilizing member by the second vibration isolation member.

Aspect 17. A vibration isolation apparatus of a compressor in a HVAC system, comprising:
 a vibration impeding structure configured to receive a refrigerant compressed by a compressor of the HVAC system; and
 a supporting structure configured to retain the vibration impeding structure when the vibration impeding structure receives the refrigerant compressed by the compressor of the HVAC system.

Aspect 18. A vibration isolation apparatus of a compressor in a HVAC system, comprising:
 a convoluted flow passage;
 a stabilizing member attached to the convoluted flow passage; and
 a structural supporting member;
 wherein the stabilizing member is configured to impede vibration along a vibration path defined by the convoluted flow passage and the stabilizing member, and the convoluted flow passage and the stabilizing member are retained by the structural supporting member.

Aspect 19. The vibration isolation apparatus of aspect 18, wherein the convoluted flow passage is configured to receive a refrigerant compressed by a compressor of the HVAC system; and the structure supporting member is configured to retain the convoluted flow passage when the convoluted flow passage receives the refrigerant compressed by the compressor of the HVAC system.

Aspect 20. The vibration isolation apparatus of aspects 18-20, further comprising
 a vibration isolating member;
 wherein the vibration isolation member is configured to isolate the structural supporting member from the stabilizing member and the convoluted flow passage.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What claimed is:

1. An air conditioning system, comprising:
 a compressor having a refrigerant outlet;
 a pipe configured to carry refrigerant;
 a vibration isolation apparatus having:
  a first stabilizing member and a second stabilizing member, the first stabilizing member connected to the refrigerant outlet and the second stabilizing member connected to the pipe;
 a flow passage in fluid communication with the refrigerant outlet and the pipe, the flow passage including end sections and a middle section between the end sections,
 wherein the end sections include at least a portion that is convoluted and the middle section includes at least a portion that is non-convoluted, or the end sections include at least a portion that is non-convoluted and the middle section includes at least a portion that is convoluted, and wherein the end sections and the middle section overlap at a junction between the end sections and the middle section, and the junction includes a sloped structure within the flow passage, and
 the flow passage is situated between the first stabilizing member and the second stabilizing member;
 a first vibration isolation member; and
 a structural supporting member situated between the first stabilizing member and the second stabilizing member, wherein the structural supporting member has a first end and a second end, the first end is attached to the first stabilizing member by the first vibration isolation member.

2. The air conditioning system of claim 1, further comprising:
 a second vibration isolation member,
 wherein the second end of the structural supporting member is attached to the second stabilizing member by the second vibration isolation member.

3. The air conditioning system of claim 2, wherein the first stabilizing member has a first vibration isolation cavity to accept the first vibration isolation member, and a second vibration isolation cavity to accept the second vibration isolation member.

4. The air conditioning system of claim 1, wherein the first end of the structural supporting member is attached to an end cap and a holding member, the end cap and the holding member press the first vibration isolating member against the first stabilizing member.

5. The air conditioning system of claim 1, further comprising:
a second vibration isolation apparatus,
wherein the compressor has an inlet, and the second vibration isolation apparatus is attached to the inlet of the compressor.

6. The air conditioning system of claim 1, wherein the middle section has an outer diameter that is smaller than an inner diameter of the end sections such that an outer surface of the middle section is secured to inner surfaces of the end sections.

7. The air conditioning system of claim 1, wherein the end sections and the middle section are a one-piece construction.

8. The air conditioning system of claim 1, an end of the middle section at the junction includes the sloped structure forming an inward ramp from an opening of the end and a rounded portion that is configured to connect the sloped structure to an internal surface of the middle section, the sloped structure and rounded portion collectively configured to provide a smooth surface for refrigeration flowing through the flow path.

9. A vibration isolation apparatus of a compressor in a HVAC system, comprising:
a flow passage, the flow passage including end sections and a middle section between the end sections, wherein the end sections include at least a portion that is convoluted and the middle section includes at least a portion that is non-convoluted, or the end sections include at least a portion that is non-convoluted and the middle section includes at least a portion that is convoluted, and wherein the end sections and the middle section overlap at a junction between the end sections and the middle section, and the junction includes a sloped structure within the flow passage;
a stabilizing member attached to the convoluted flow passage; and
a structural supporting member;
wherein the stabilizing member is configured to impede vibration along a vibration path defined by the convoluted flow passage and the stabilizing member, and the convoluted flow passage and the stabilizing member are retained by the structural supporting member; wherein the flow passage is configured to receive a refrigerant compressed by the compressor of the HVAC system; and the structural supporting member is configured to retain the flow passage when the flow passage receives the refrigerant compressed by the compressor of the HVAC system.

10. The vibration isolation apparatus of claim 9, further comprising
a vibration isolating member;
wherein the vibration isolation member is configured to isolate the structural supporting member from the stabilizing member and the flow passage.

* * * * *